US006439531B1

United States Patent
Severini et al.

(10) Patent No.: US 6,439,531 B1
(45) Date of Patent: Aug. 27, 2002

(54) EASY ENTRY SEAT TRACK ASSEMBLY

(75) Inventors: Joseph A. Severini, Holland Landing; Alan Kam Lun Chan, Markham; Edilbert Delgado Yu, Ajax, all of (CA)

(73) Assignee: Magna Seating Systems, Inc., Aurora (CA)

( * ) Notice: Subject to any disclaimer, the term of this patent is extended or adjusted under 35 U.S.C. 154(b) by 0 days.

(21) Appl. No.: 09/668,654

(22) Filed: Sep. 22, 2000

Related U.S. Application Data
(60) Provisional application No. 60/155,427, filed on Sep. 22, 1999.

(51) Int. Cl.[7] ............................................... F16M 13/00
(52) U.S. Cl. ........................ 248/423; 248/429; 297/341; 297/344.1
(58) Field of Search ................................ 248/424, 429, 248/430, 425; 297/341, 344.1

(56) References Cited

U.S. PATENT DOCUMENTS

| | | | |
|---|---|---|---|
| 4,304,386 A | 12/1981 | Nagashima et al. | |
| 4,639,038 A | 1/1987 | Heling | |
| 4,671,571 A | 6/1987 | Gionet | |
| 4,844,542 A | 7/1989 | Humer | |
| 4,856,847 A | 8/1989 | Kanai | |
| 4,909,570 A | 3/1990 | Matsuhashi | |
| 4,961,559 A | * 10/1990 | Raymor | 248/429 |
| 5,028,063 A | 7/1991 | Andrews | |
| 5,052,751 A | 10/1991 | Hayakawa et al. | |
| 5,137,331 A | 8/1992 | Colozza | |
| 5,259,257 A | 11/1993 | Mouri | 74/89.15 |
| 5,352,019 A | 10/1994 | Bauer et al. | 297/341 |
| 5,407,165 A | 4/1995 | Balocke | |
| 5,445,354 A | 8/1995 | Gauger et al. | 248/429 |

(List continued on next page.)

FOREIGN PATENT DOCUMENTS

| | | |
|---|---|---|
| EP | 0 683 066 A1 | 11/1995 |
| EP | 0 683 066 B1 | 7/1998 |
| GB | 2 255 903 A | 11/1992 |
| JP | 02310132 | 12/1990 |
| WO | WO 01/21432 | * 3/2001 |

Primary Examiner—Leslie A. Braun
Assistant Examiner—Tan Le
(74) Attorney, Agent, or Firm—Clark Hill PLC

(57) ABSTRACT

A seat assembly for a vehicle having a seat cushion and an seat back pivotally connected to the seat cushion for movement between a plurality of reclined seating positions and a forwardly dumped position. A track assembly has a pair of upper tracks mounted to the seat cushion and a pair of lower tracks mounted to the floor of the vehicle. The upper tracks are slidably coupled to the lower tracks for providing sliding movement of the seat assembly between a full forward position and a full rearward position. A locking mechanism is operatively coupled to the upper and lower tracks for movement between a locked position interlocking the tracks and an unlocked position allow sliding movement therebetween. A cam plate is pivotally coupled to one of the upper tracks for movement between a non-actuated position spaced from the locking mechanism and a actuated position engaged with the locking mechanism for maintaining the locking mechanism in the unlocked position in response to pivotal movement of the seat back from the reclined seating position to the forwardly dumped position. A trigger arm interlocks with the cam plate in the actuated position to maintain the locking mechanism in the unlocked position and allow sliding movement of the seat assembly to a forwardly extended position beyond the full forward seating position. A trigger tab engages the trigger arm when the seat is returned from the forwardly extended position to the full rearward position to release the cam plate to the non-actuated position and allow the locking mechanism to return to the locked position interlocking the upper and lower tracks and preventing further sliding movement therebetween.

9 Claims, 6 Drawing Sheets

U.S. PATENT DOCUMENTS

| | | |
|---|---|---|
| 5,456,439 A | 10/1995 | Gauger .................. 248/429 |
| 5,467,957 A | 11/1995 | Gauger .................. 248/429 |
| 5,516,071 A | 5/1996 | Miyauchi |
| 5,575,531 A | 11/1996 | Gauger et al. ......... 297/362.11 |
| 5,683,140 A | 11/1997 | Roth et al. |
| 5,688,026 A | 11/1997 | Reubeuze et al. .......... 297/341 |
| 5,785,292 A * | 7/1998 | Muraishi et al. ............ 248/429 |
| 5,791,622 A | 8/1998 | Gauger .................. 248/430 |
| 5,855,349 A | 1/1999 | Nini et al. |
| 5,855,413 A | 1/1999 | Couasnon et al. .......... 297/341 |
| 5,882,074 A | 3/1999 | Kojima |
| 5,899,532 A | 5/1999 | Paisley et al. ............... 297/341 |
| 5,944,383 A | 8/1999 | Mathey et al. |
| 6,098,946 A * | 8/2000 | Sechet et al. ............... 248/424 |

* cited by examiner

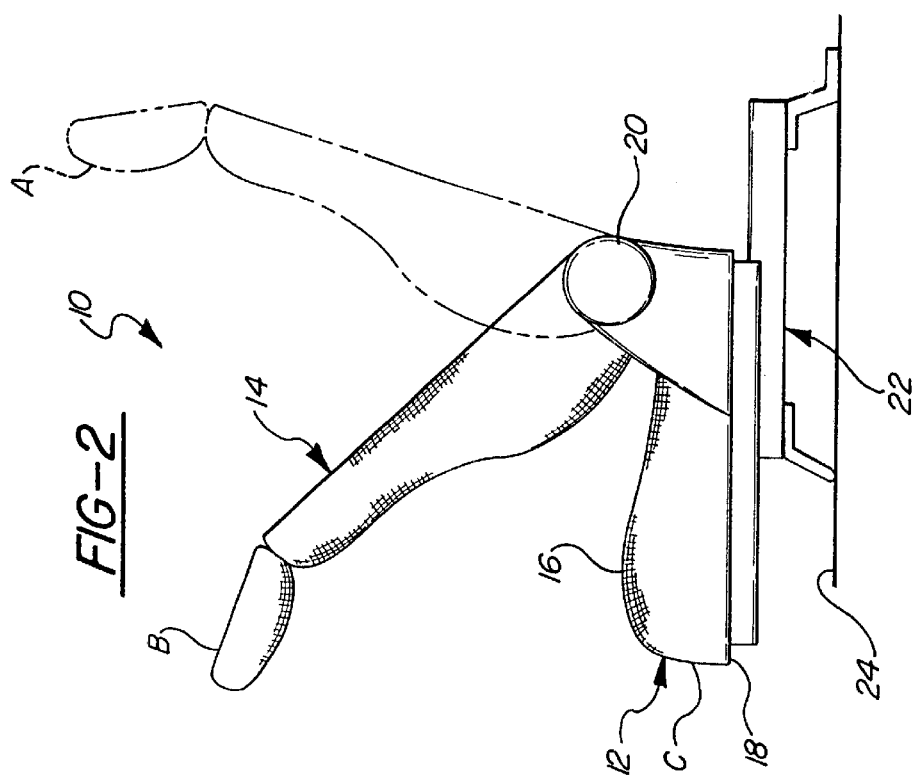
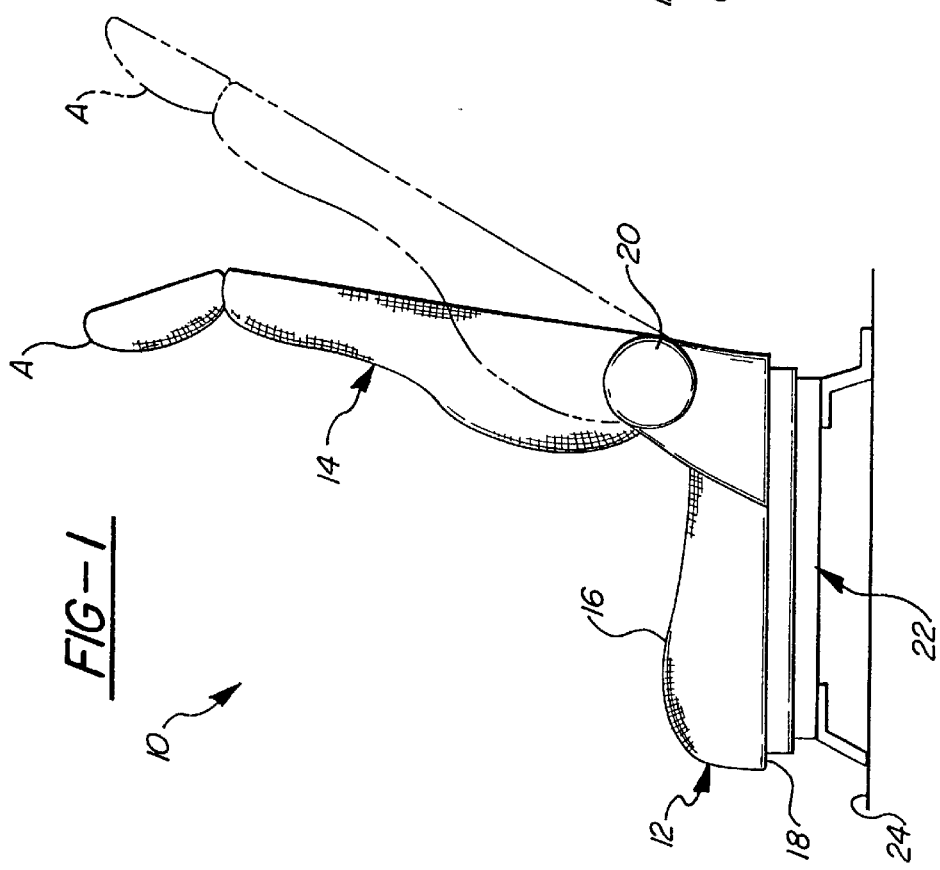

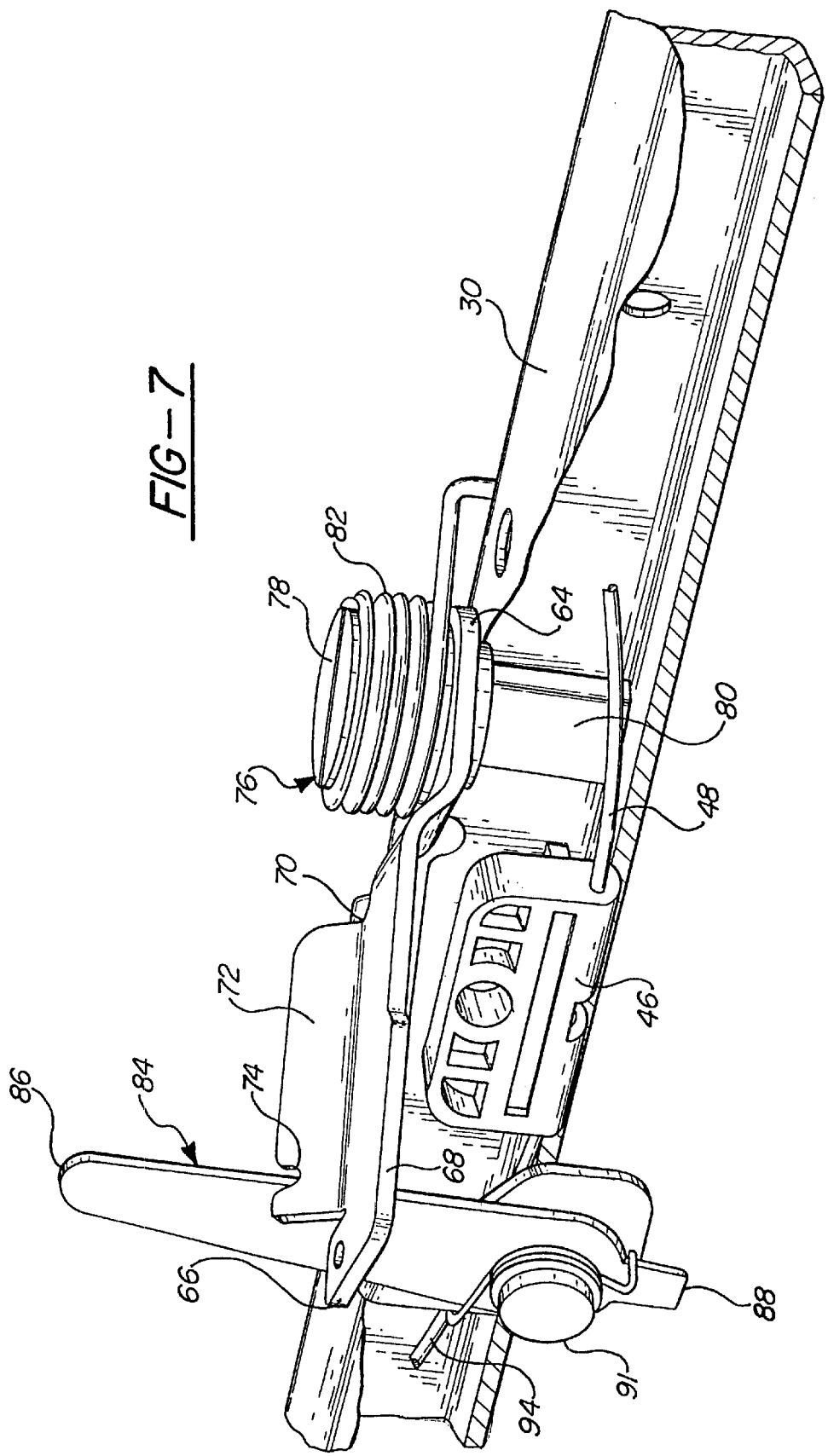

EASY ENTRY SEAT TRACK ASSEMBLY

RELATED APPLICATIONS

This application claims benefit under 35 USC 119(e) of U.S provisional application No. 60/155,427, filed on Sep. 22, 1999.

BACKGROUND OF THE INVENTION

1. Field of the Invention

The subject invention relates to an automotive seat track assembly for providing incremental fore and aft seat adjustment and having a seat dumping mechanism for providing additional seat track travel as well as a single point full rear memory.

2. Description of the Prior Art

Automotive vehicles include seat assemblies for supporting a seated occupant in the vehicle. The seat assemblies typically include a seat cushion and a seat back pivotally connected to the seat cushion by a recliner mechanism for allowing pivotal adjustment of the seat back relative to the seat cushion between a plurality of reclined positions. Further, seat assemblies typically include a track assembly for providing incremental fore and aft sliding adjustment of the seat assembly in the vehicle within a predetermined comfort range of seating positions defined by the track assembly, such as between a full forward and full rearward position.

It is commonly known for the recliner mechanism and track assembly to allow the seat assembly to be dumped forward to a forwardly extended dumped position extending beyond, or forward of the comfort range, i.e. forward of the full forward position, in order to facilitate access to an area behind the seat assembly within the vehicle. Additionally, some track assemblies known in the art allow the seat assembly to return from the forwardly extended dumped position to the full forward position or full rearward position. More complex and expensive track assemblies even allow the seat to be returned to the original seating position. Such track assemblies are often referred to as having seat track memory.

It remains desirable to provide a simple, inexpensive and reliable seat track assembly which allows the seat assembly to be dumped forward and extended to a forwardly extended position, extending beyond the full forward seating position within the comfort range, and returned to a predetermined single point memory position within the comfort range.

SUMMARY OF THE INVENTION

The invention relates to a seat track assembly comprising a lower track member and an upper track member movably mounted to the lower track member. A rotating cam is mounted to the upper track member and a flange is mounted to the upper track member and extending outwardly therefrom. A pawl is pivotally mounted to the flange for selectively engaging the cam and for interlocking the cam and selectively releasing the cam to provide a memory feature for the seat track assembly.

BRIEF DESCRIPTION OF THE DRAWINGS

Advantages of the present invention will be readily appreciated as the same becomes better understood by reference to the following detailed description when considered in connection with the accompanying drawings wherein:

FIG. 1 is side view of a seat assembly supported by a track assembly according to the subject invention and positioned within the comfort range of seating positions;

FIG. 2 is a side view of the seat assembly in a forwardly extended position with the track assembly extended forward of the full forward seating position;

FIG. 7 is a side perspective view of the seat track assembly in forwardly extended position.

DETAILED DESCRIPTION OF THE PREFERRED EMBODIMENT

Figure 3:
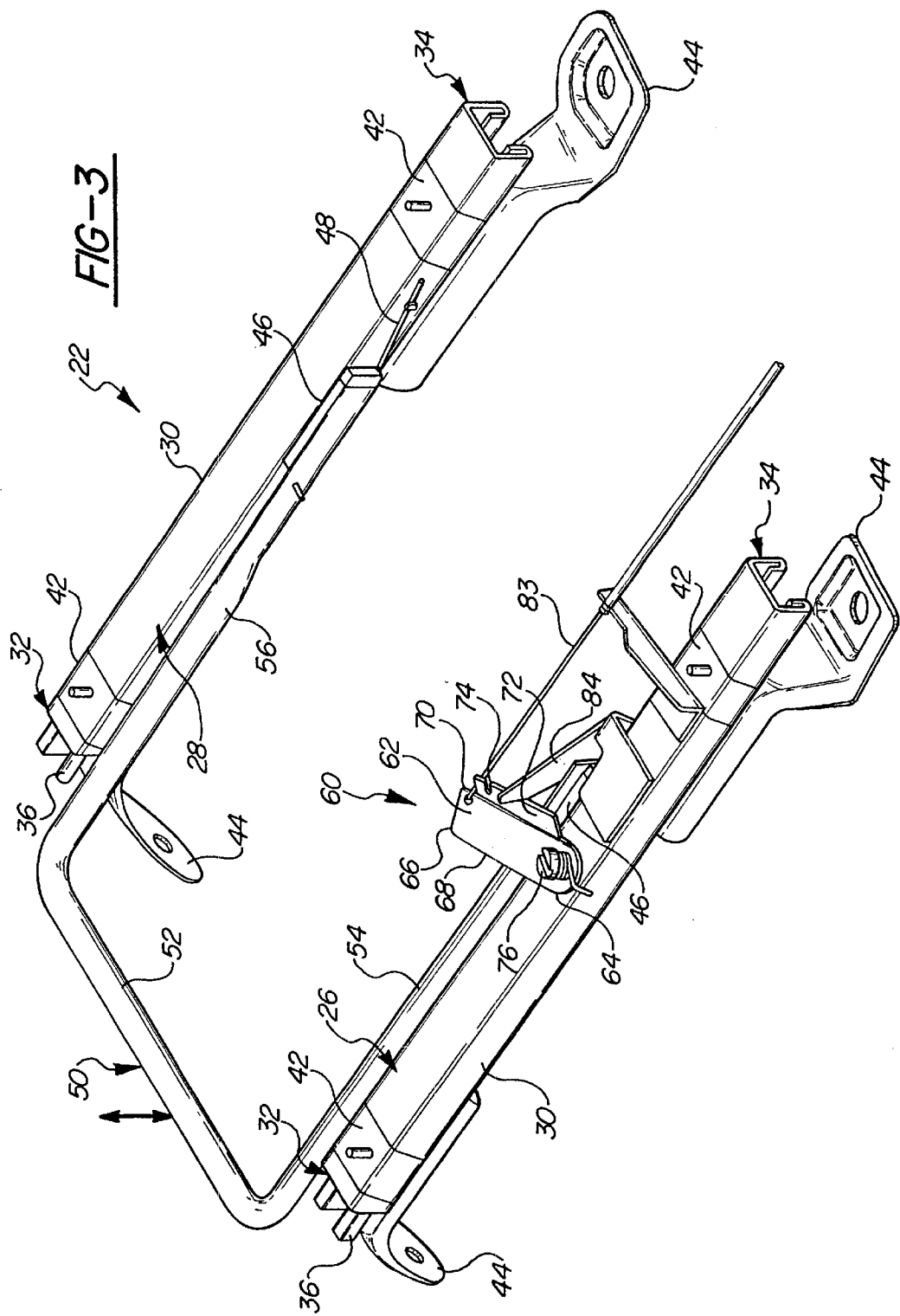
FIG. 3 is a perspective view of the seat track assembly.

Referring to FIG. 1, a seat assembly is generally shown at 10 for use in an automotive vehicle. The seat assembly 10 includes a generally horizontal seat cushion 12 and a seat back 14. The seat cushion 12 has an upper surface 16 for supporting a seat occupant and an opposite lower mounting surface 18. A recliner assembly 20 of the type commonly known to one of ordinary skill in the art, pivotally interconnects the seat back 14 to the seat cushion 12 and provides pivotal adjustment of the seat back 14 between a plurality of reclined seat positions, shown at A in FIG. 1, and a forwardly dumped position, shown at B in FIG. 2.

A seat track assembly 22 is disposed between the seat assembly 10 and the floor of the vehicle, illustrated at 24, for slidably supporting the seat assembly 10. The track assembly 22 provides incremental fore and aft sliding adjustment of the seat assembly 10 relative to the floor 24 between a plurality of seating positions within a comfort range defined by a full forward seating position and a full rearward seating position. Further, the track assembly 22 allows the seat assembly to be moved beyond the full forward seating position within the comfort range to a forwardly extended position, shown at C in FIG. 2, in response to the pivotal movement of the seat back 14 to the forwardly dumped position B, to allow easy access to the area within the vehicle behind the seat assembly 10. Still further, the track assembly 22 also allows the seat assembly 10 to be returned from the forwardly extended position C to a predetermined single point memory position, such as the full rearward seating position, in the preferred embodiment.

More specifically, referring to FIG. 3, the seat track assembly 22 includes an inboard track assembly 26 and an outboard track assembly 28 spaced from and parallel to the inboard track assembly 26. Each inboard 26 and outboard 28 track assembly extend longitudinally between a forward end 32 and a rearward end 34 and include a generally U-shaped upper track 30 and a generally U-shaped lower track 36. The upper track 30 is slidably interlocked to the lower track 36, as is commonly known to one of ordinary skill in the art, to allow the upper track 30 to slide fore and aft relative to the lower track 36. Upper mounting brackets 42 are fixedly secured between the upper track 30 and the lower surface 18 of the seat cushion 12 for mounting the track assembly 22 to the seat assembly 10. Lower mounting brackets 44 are fixedly secured between the lower track 36 and the floor 24 for mounting the seat assembly 10 to the vehicle.

The track assembly 22 further includes a locking mechanism 46 operatively connected to the upper track 30 on each of the inboard 26 and outboard 28 track assemblies for interlocking and preventing sliding fore and aft movement between the upper and lower tracks 30, 36. The locking mechanism 46 is selectively moveable between a locked position lockingly engaged between the upper and lower tracks 30, 36 and an unlocked position spaced from and disengaged from the lower track 36. A plurality of teeth are disposed within the lower track 36 for locking engagement with the locking mechanism 46. The locking mechanism 46 is movably mounted to the upper track 30 and has at least one projecting flange which includes an aperture. The projecting flange extends into the upper track 30 and selectively engages and disengages the teeth of the lower track 36 to selectively secure the upper and lower tracks 30, 36 together in the locked and unlocked positions, respectively. In other words, the locking mechanism 46 facilitates the incremental adjustment of the seat 10. A biasing member 48, such as a wire spring, is coupled between the locking mechanism 46 and the upper track 30 for biasing the locking mechanism 46 in the locked position and maintaining the position of the upper track 30 relative to the lower track 36. The biasing member 48 continuously biases the apertures toward engagement with the teeth. The biasing member 48 is preferably a wire spring having a pair of distal ends which mount to the upper track 30 and a mid section which supports the locking mechanism 46. A generally U-shaped release bar 50 includes a center towel bar 52 extending between the inboard and outboard track assemblies 26, 28 and lever bars 54, 56 extending from the towel bar 52 to the upper tracks 36 adjacent to the locking mechanism 46 on the respective inboard and outboard track assemblies 26, 28. The lever bars 54, 56 are pivotally secured to the upper tracks 36 and fixedly secured to the locking mechanism 46 for actuating the locking mechanism 46 between the locked and unlocked positions. The locking mechanism 46, biasing member 48 and release bar 50 are all of the type commonly known to one of ordinary skill in the art. Further it should be appreciated that the locking mechanism 46 may be provided on one or both of the inboard or outboard track assemblies 26, 28; however, preferably, and in the preferred embodiment, is provided on both to ensure full locking engagement between the upper and lower tracks 30, 36.

In order to incrementally adjust the sliding fore and aft position of the seat assembly 10 within the comfort range, a force is applied upwardly on the release bar 50 to pivot upwardly and engage the lever bars 54, 56 with the respective locking mechanism 46. The locking mechanism 46 is forced downwardly against the biasing force of the spring 48 from the locked position engaged between the upper and lower tracks 30, 36 to the unlocked position disengaged from the lower track 36. The seat assembly 10 may now be slide forwardly or rearwardly relative to the floor 24 of the vehicle to a desired seating position between the full forward position and the full rearward position defining the comfort range of seating positions. Once the seat assembly 10 is moved to a desired seating position, the force applied to the release bar 50 is removed to allow the locking mechanism 46 to return to the locked position, engaged between the upper and lower tracks 30, 36 whereby the position of the seat assembly 10 is maintained.

Figure 4:
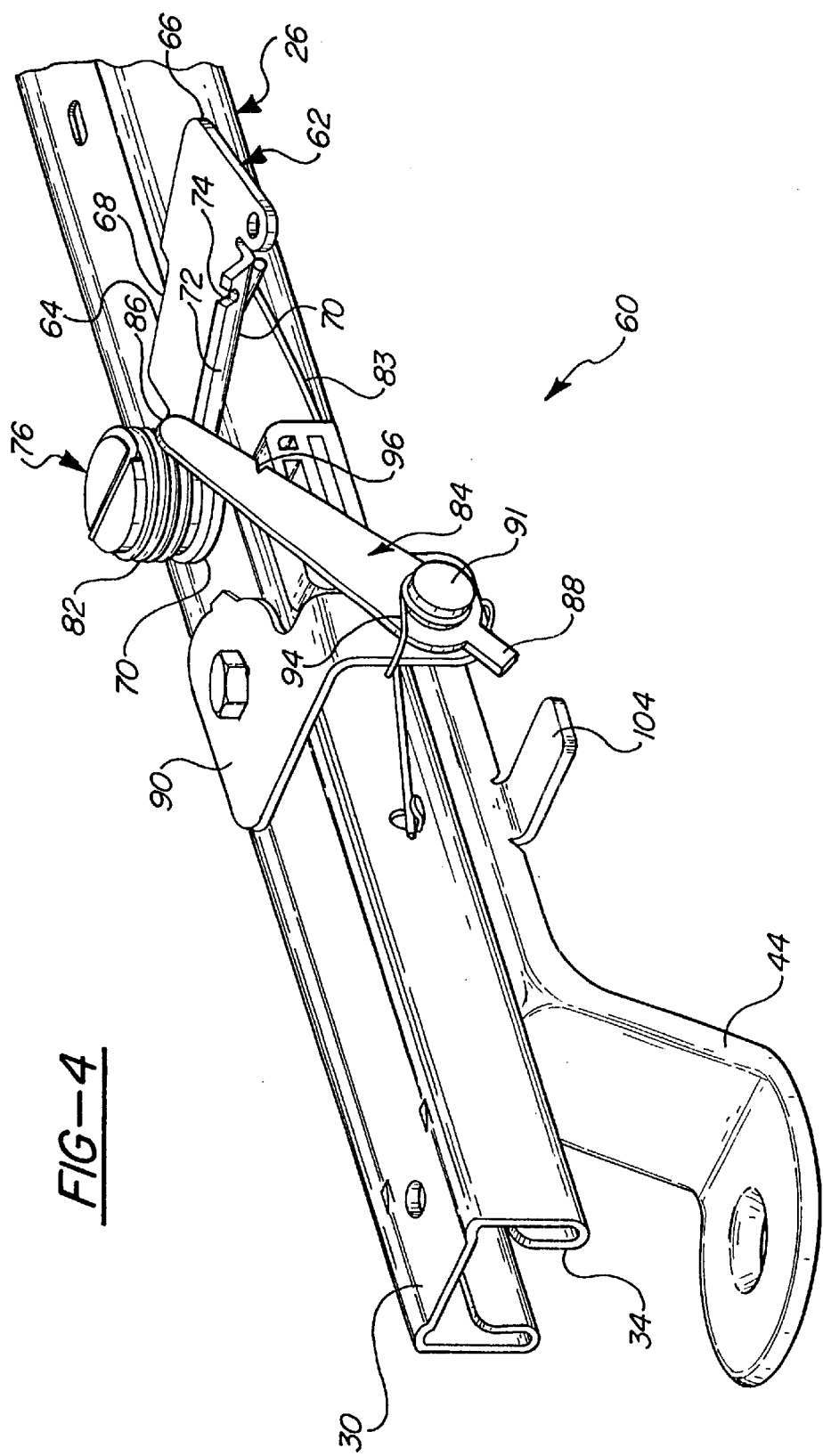
FIG. 4 is a perspective view of one side of the seat track assembly.

Referring to FIGS. 3 and 4, the seat assembly 10 further includes a seat dumping mechanism 60 which allows the seat assembly 10 to be moved beyond the full forward position to the forwardly extended position C and also allows the seat assembly 10 to return from the forwardly extended position C to a predetermined single point memory position within the comfort range such as the full rearward position.

Figure 5:
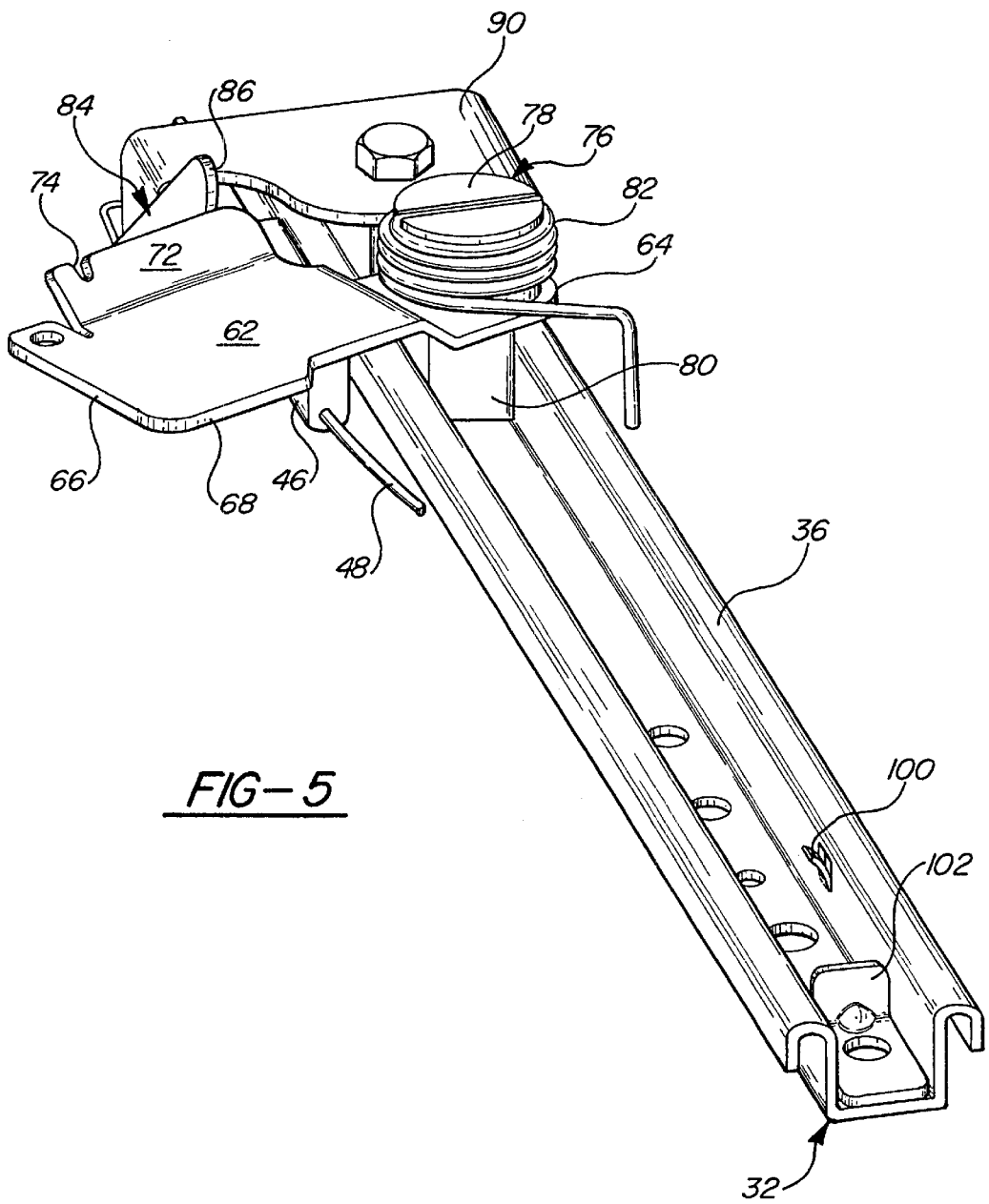
FIG. 5 is a perspective view of the seat track assembly of FIG. 4 with the upper track removed.
Figure 6:
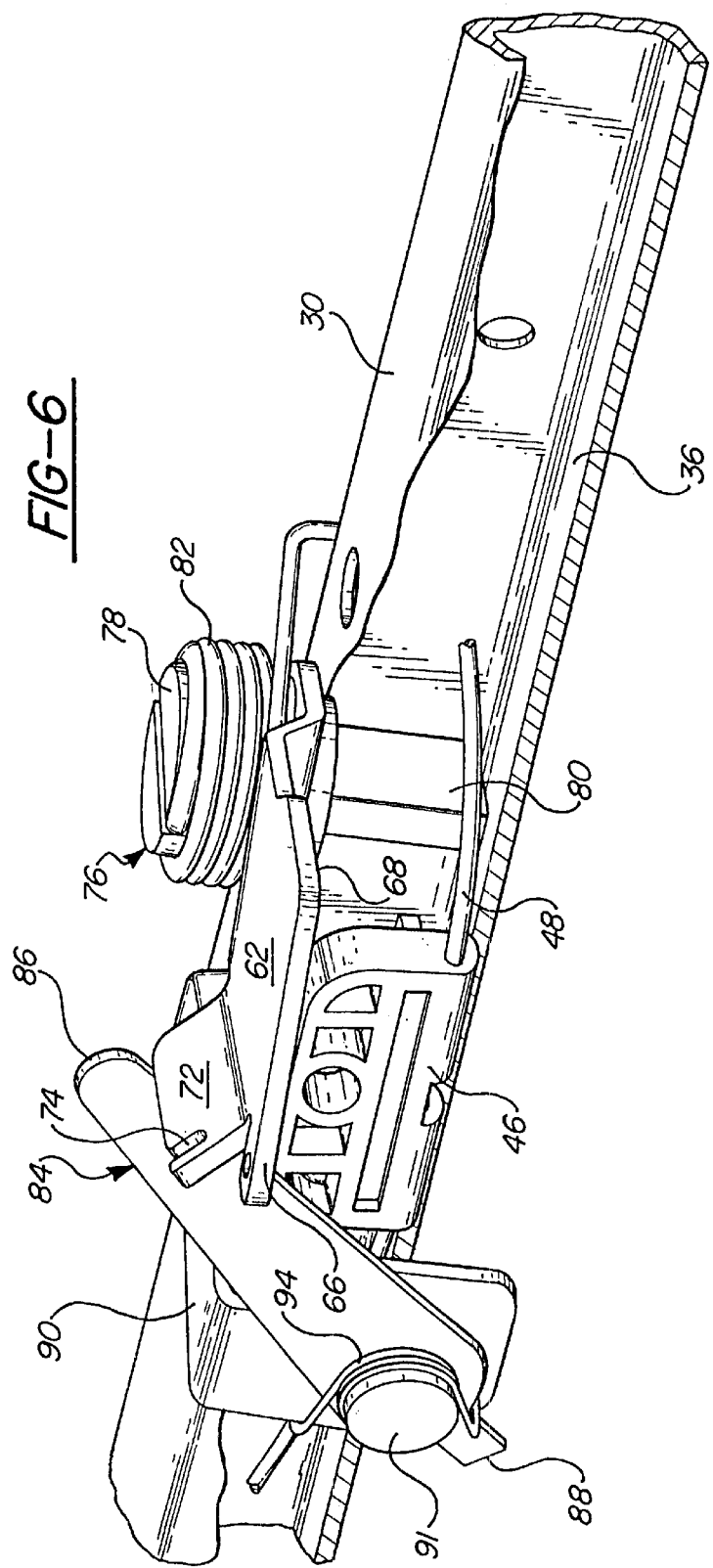
FIG. 6 is a side perspective view of the seat track assembly in an incremental adjustment mode.

The seat dumping mechanism 60 includes a cam plate 62 having a first end 64 and a second distal end 66 connected by substantially parallel leading and trailing edges 68, 70. A ramped portion 72 extends upwardly and rearwardly from the trailing edge 70 forming an inclined or sloped camming surface for slidably engaging the locking mechanism 46. A notch 74 is formed in the ramped portion 72 adjacent the second distal end 66 of the cam plate 62. The first end 64 of the cam plate 62 is pivotally connected to the upper track 30 of the inboard track assembly 26 by a pivot nut 76 such that the cam plate 62 extends outwardly from the upper track 30 in a generally flat horizontal plane towards the outboard track assembly 28. The cam plate 62 is pivotal about the upper track 30 between a non-actuated position with the leading edge 68 adjacent the upper track 30 and the ramped portion 72 spaced forwardly from the locking mechanism 46. as shown in FIGS. 3 and 4, and an actuated position pivoted rearwardly and extending generally perpendicular to the longitudinal length of the upper track 30 and engaged with the locking mechanism 46, as shown in FIG. 7. Referring to FIGS. 5 and 6, the pivot nut 76 includes a head 78 seated above the cam plate 62 and a generally cylindrical shaft extending from the head 78 to a generally rectangular blocking plate 80 positioned in the space between the upper track 30 and the lower track 36. The pivot nut 76 is keyed to the cam plate 62 and rotatable therewith between a blocking position with the rectangular blocking plate 80 extending across or transversely within the space between the upper and lower tracks 30, 36, as shown in FIG. 6, and an unblocking position with the rectangular blocking plate 80 aligned generally parallel to the longitudinal length of the upper and lower tracks 30, 36, as shown in FIG. 7. A biasing member 82, such as a coil spring as shown, is connected between the head 78 of the pivot nut 76 and the first end 64 of the cam plate 62 for pivotally biasing the cam plate 62 in a counterclockwise direction to the non-actuated position and also pivotally biasing the pivot nut 76 in a counterclockwise direction to the blocking position. It should be appreciated that the biasing member 82 may alternatively include a spring extending between any portion of the cam plate 62 and the inboard track assembly 26 for biasing the cam plate 62 in the non-actuated position.

A cable 83 is connected between the cam plate 62, adjacent the trailing edge 70, and the seat back 14 for pivoting, or rotating, the cam plate 62 in the clockwise direction from the non-actuated position to the actuated position in response to pivotal movement of the seat back 14 from one of the reclined seating position to the forwardly dumped position. Alternatively, the cable 83 may be connected between the cam plate 62 and a release lever on the seat cushion 12 or seat back 14 for pivoting the cam plate 62 from the non-actuated position to the actuated position. The cam plate 62 also rotates the pivot nut 76 from the blocking position, when the cam plate 62 is in the non-actuated position, to the unblocking position, when the cam plate 62 is in the actuated position.

The seat dumping mechanism 60 further includes a trigger arm 84 comprising an elongated plate extending between an upper end 86 and a lower abutment end 88. The trigger arm 84 is pivotally connected to a support bracket 90 by a pivot pin 91 positioned between the upper end 86 and lower end 88. The support bracket 90 is fixedly secured to the upper track 30 by a fastener, such as a bolt, screw, weld, or the like. A biasing member 94, such as a coil spring or wire spring, is connected between the trigger arm 84 and the upper track 30 for pivotally biasing the trigger arm 84 in a clockwise direction to an unlatched position seated adjacent or against the ramped portion 72 of the cam plate 62 and spaced inwardly from the notch 74, as shown in FIGS. 3 and 4. The upper end 86 of the trigger arm 84 extends above the cam plate 62 and the lower abutment end 88 extends below the pivot pin 91. The trigger arm 84 further includes a notch 96 in the edge facing the trailing edge 70 of the cam plate 62 for locking engagement with the notch 74 when the cam plate 62 is rotated to the actuated position.

In operation, during normal seating use of the seat assembly 10, the track assembly 22 provides incremental fore and aft sliding movement of the seat assembly within the comfort range between the full forward position and the full rearward position as previously discussed. As shown in FIGS. 3–6, with the seat 10 in the comfort range of travel, the cam plate 62 is maintained in the non-actuated position by the biasing member 82 and the trigger arm 84 is biased to the unlatched position by the biasing member 94. Additionally, the pivot nut 76 is maintained in the blocking position, transversely seated between the upper track 30 and lower track 36. Referring to FIG. 5, the blocking plate 80 is engagable with a forward stop tab 100 projecting from the lower track 36 adjacent the forward end 32 to limit travel of the upper track 30 and define the full forward position. Similarly, the blocking plate 80 may be engagable with a rearward stop tab projecting from the lower track 36 and defining the full rearward position.

To move or slide the seat assembly to the forwardly extended position, the seat back 14 is pivoted about the recliner mechanism 20 from one of the reclined seating position A to the forwardly dumped position B adjacent the seat cushion 12, as shown in FIGS. 1 and 2. The cable 83 is pulled by the seat back 14 to pull and rotate the cam plate 62 clockwise from the non-actuated position, shown in FIG. 4, to the actuated position, shown in FIG. 7. The forward edge of the trigger arm 84 slides along the ramped portion 72 of the cam plate 62 and the trigger arm 84 is forced by the cam plate 62 to pivot in a counterclockwise direction about the pivot pin 91 against the biasing force of the spring 94 until the notch 74 of the cam plate 62 interlocks with the notch 96 of the trigger arm 84 to lock the cam plate 62 in the actuated position. The trigger arm 84 is forced to pivot to a generally upright position with the lower abutment end 88 projecting downwardly below the lower track 36.

Additionally, the ramped portion 72 of the cam plate 62 slidably engages the top of the locking mechanism 46 to push the locking mechanism 46 downwardly out of engagement with the lower track 36 to the unlocked position when the cam plate 62 is in the actuated position. That is, the cam plate 62 is held in the actuated position by the trigger arm 84, thus maintaining the locking mechanism 46 in the unlocked position. The seat assembly 10 may now slide freely along the lower track 36 to the forwardly extended position.

Still further, the cam plate 62 also rotates the pivot nut 76 from the blocking position to the unblocking position wherein the blocking plate 80 is seated parallel to the lower track 36, as shown in FIG. 7. In the unblocking position, the blocking plate 80 is free to slide past the forward stop tab 100 on the lower track 36 and allow the upper track 30 to continuing extending forwardly until the blocking plate 80 engages a full forward stop wall 102 projecting from the forward end 32 of the lower track 36 and defining the forwardly extended position, as shown in FIG. 5. Therefore, the seat assembly 10 is provided with additional forward sliding travel by the seat track assembly 22 when in the forward dumped position and forwardly extended position beyond the comfort range of travel. This allows greater access to the area within the vehicle behind the seat assembly 10.

To return the seat assembly 10 from the forwardly extended position C to the predetermined single point memory position, in the preferred embodiment defined as the full rearward position, the seat back 14 is first pivotally returned from the forwardly dumped position B to one of the reclined seating positions A. The locking mechanism 46 remains in the unlocked position even with the seat back 14 returned to the seating position due to the cam plate 62 remaining interlocked with the trigger arm 84 in the actuated position. Therefore, the seat assembly 10 is free to move or slide rearwardly with the upper track 30 sliding relative to the lower track 36. As the seat assembly 10 continues to return from the forwardly extended position to the predetermined single point memory position; that is, the full rearward position, the lower abutment end 88 of the trigger arm 84 engages a trigger tab 104 projecting laterally from the lower mounting bracket 44 adjacent the rearward end 34 of the track assembly 26, as shown in FIG. 4. As the trigger arm 84 continues to travel rearwardly past the tab 102, the trigger tab 102 engages the lower abutment end 88 and forces the trigger arm 84 to rotate in the counterclockwise direction away from the ramped portion 72 of the cam plate 62. The notch 96 is released from the notch 74 to unlock the trigger arm 84 from the cam plate 62. The biasing member 82 forces the cam plate 62 to rotate in the counterclockwise direction from the actuated position and return to the non-actuated position. In the non-actuated position, the cam plate 62 is disengaged and spaced from the locking mechanism 46 such that the biasing member 48 forces the locking mechanism 46 to return to the locked position lockingly engaged between the upper track 30 and lower track 36 to lock the seat assembly 10 in the full rearward position providing easy access for the occupant into the seat assembly 10. The seat assembly 10 may then again be adjusted with the comfort range or again moved to the forward extended position as described above.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that the invention may be practiced otherwise than as specifically described.

What is claimed is:

1. A seat track assembly comprising:

an inboard track assembly spaced parallel to an outboard track assembly, each of said inboard and outboard track assemblies including elongated upper and lower tracks extending between forward and rearward ends with said upper tracks slidably coupled to said lower tracks;

a locking mechanism operatively coupled between said upper track member and said lower track member for interlocking said upper and lower tracks in a locked position to prevent fore and aft movement therebetween and for unlocking said upper and lower tracks in an unlocked position to provide sliding movement of said upper track along said lower track between a full forward position and a full rearward position;

a dumping mechanism operatively coupled between said upper track member and said locking mechanism for retaining said locking mechanism in said unlocked position during said fore and aft sliding movement between said upper and lower tracks and releasing said locking mechanism to said locked position when said upper track reaches a predetermined memory position defined between said full forward and full rearward positions relative to said lower track, said dumping mechanism including a cam plate pivotally connected to said upper track for movement between a non-actuated position spaced from said locking mechanism and an actuated position engaging and retaining said locking mechanism into said unlocked position and a trigger arm pivotally connected to said upper track adjacent said cam plate for selectively engaging and retaining said cam plate in said actuated position and selectively releasing said cam plate to said non-actuated position, said cam plate includes a first end pivotally coupled to one of said upper tracks by a pivot nut, an opposite second distal end, a leading edge extending between said first and second end and an opposite trailing edge extending between said first and second end for engaging said locking mechanism; and a trigger tab projecting from said lower track for engaging and releasing said trigger arm from said cam plate when said upper track reaches said predetermined memory position whereby said cam plate is automatically returned to said non-actuated position and said locking mechanism to said locked position for interlocking said upper and lower track members in said predetermined memory position.

2. A seat track assembly as set forth in claim 1 further including a biasing member coupled between said upper track and said cam plate for biasing said cam plate in said non-actuated position spaced from engagement with said locking mechanism.

3. A seat track assembly as set forth in claim 2 wherein said locking mechanism includes a block slidably coupled to said upper track for engagement with said lower track and biased to said unlocked position by a biasing member coupled between said block and said upper track.

4. A seat track assembly as set forth in claim 3 wherein said cam plate includes a ramp portion formed in said trailing edge defining an inclined camming surface for engaging the top surface of said block to force said block against said biasing member from said locked position to said unlocked position.

5. A seat track assembly as set forth in claim 4 wherein said trigger arm is pivotally coupled to said upper track by a pivot pin and biased toward engagement with said cam plate by a biasing member.

6. A seat track assembly as set forth in claim 5 wherein said trigger arm includes an upper end extending above said upper track for engaging said cam plate and an opposite lower abutment end for engaging said trigger tab in said predetermined memory position.

7. A seat track assembly as set forth in claim 6 wherein said trigger arm includes a notch for engaging with a corresponding notch in said trailing edge of said cam plate to retain said cam plate in said actuated position and said locking mechanism in said unlocked position.

8. A seat track assembly as set forth in claim 7 further including a release bar coupled to said locking mechanism for selectivedly actuating said locking mechanism between said locked and unlocked position to allow fore and aft sliding movement of said upper tracked relative to said lower tracks between said full forward and full rearward positions.

9. A seat track assembly as set forth in claim 8 further including a mounting brackets coupled to said upper tracks for mounting said seat track assembly to a seat cushion of an automotive seat assembly.

* * * * *

UNITED STATES PATENT AND TRADEMARK OFFICE
CERTIFICATE OF CORRECTION

PATENT NO.    : 6,439,531 B1                                            Page 1 of 1
DATED         : August 27, 2002
INVENTOR(S)   : Severini et al.

It is certified that error appears in the above-identified patent and that said Letters Patent is hereby corrected as shown below:

Column 1,
Line 65, insert -- a -- after "FIG. 1 is";

Column 2,
Line 51, delete "extend" and insert -- extends -- therefor;
Line 52, delete "include" and insert -- includes -- therefor;

Column 3,
Line 4, delete "are" and insert -- is -- therefor;
Line 48, delete "be";

Column 4,
Line 46, delete "position" and insert -- positions -- therefor;

Column 5,
Line 56, delete "continuing" and insert -- continue -- therefor;

Column 7,
Lines 13 and 15, delete "end" and insert -- ends -- therefor;

Column 8,
Line 25, delete "tracked" and insert -- tracks -- therefor; and
Line 29, delete "brackets" and insert -- bracket -- therefor.

Signed and Sealed this

Twenty-eighth Day of January, 2003

JAMES E. ROGAN
*Director of the United States Patent and Trademark Office*